(12) United States Patent  (10) Patent No.: US 7,948,301 B2
Cook et al.  (45) Date of Patent: May 24, 2011

(54) CHARGE PUMP WITH CHARGE FEEDBACK AND METHOD OF OPERATION

(75) Inventors: Thomas D. Cook, Austin, TX (US); Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/549,499

(22) Filed: Aug. 28, 2009

(65) Prior Publication Data

US 2011/0050326 A1  Mar. 3, 2011

(51) Int. Cl.
 G05F 1/10 (2006.01)
(52) U.S. Cl. .......................................... 327/536; 363/60
(58) Field of Classification Search .................. 327/536; 363/59–60
 See application file for complete search history.

(56) References Cited

U.S. PATENT DOCUMENTS

| | | | |
|---|---|---|---|
| 4,451,743 A * | 5/1984 | Suzuki et al. ................. | 307/110 |
| 5,959,854 A | 9/1999 | Okada | |
| 5,999,040 A | 12/1999 | Do et al. | |
| 6,091,613 A * | 7/2000 | Yang et al. ...................... | 363/60 |
| 6,169,673 B1 * | 1/2001 | McIntyre et al. ............... | 363/59 |
| 6,249,445 B1 | 6/2001 | Sugasawa | |
| 6,429,723 B1 | 8/2002 | Hastings | |
| 6,504,422 B1 * | 1/2003 | Rader et al. .................... | 327/536 |
| 6,784,723 B2 | 8/2004 | Lee et al. | |
| 6,831,500 B2 | 12/2004 | Sato et al. | |
| 6,834,001 B2 * | 12/2004 | Myono ............................ | 363/60 |
| 6,859,091 B1 | 2/2005 | Nicholson et al. | |
| 6,934,187 B2 | 8/2005 | Cheung | |
| 7,009,857 B2 | 3/2006 | Chen et al. | |
| 7,173,478 B2 | 2/2007 | Chun | |
| 7,236,046 B2 * | 6/2007 | Georgescu et al. ........... | 327/536 |
| 7,262,996 B2 | 8/2007 | Cheung | |
| 7,348,829 B2 | 3/2008 | Choy et al. | |
| 7,468,898 B2 * | 12/2008 | Ogata et al. ..................... | 363/59 |
| 7,512,008 B2 | 3/2009 | Chan et al. | |
| 7,518,892 B2 | 4/2009 | Kitagawa et al. | |
| 7,558,129 B2 | 7/2009 | Thorp et al. | |
| 7,667,530 B2 * | 2/2010 | Chu et al. ....................... | 327/536 |
| 7,683,700 B2 | 3/2010 | Huynh et al. | |
| 7,755,584 B2 | 7/2010 | Senda et al. | |
| 2007/0052471 A1 * | 3/2007 | Ng ................................. | 327/536 |
| 2007/0252791 A1 * | 11/2007 | Oomori .......................... | 345/76 |

(Continued)

OTHER PUBLICATIONS

U.S. U.S. Appl. No. 12/619,303 filed Nov. 16, 2009.

(Continued)

*Primary Examiner* — Thomas J Hiltunen
(74) *Attorney, Agent, or Firm* — James L. Clingan, Jr.; Robert L. King (57) ABSTRACT

A charge pump charges a first capacitor to a predetermined input voltage using a first switch. The first switch is coupled to a first terminal of the first capacitor for coupling the first terminal to an input terminal that receives the predetermined input voltage. A second switch couples a second terminal of the first capacitor to a reference voltage terminal. Charge is sequentially transferred from the first capacitor to an output capacitance by using the first switch. A portion of charge is sequentially removed from the output capacitance to the input terminal using a third switch and a second capacitor. Configuration logic provides control signals to make one or more of a plurality of charge transfer capacitors switch the same as said first capacitor switches.

20 Claims, 5 Drawing Sheets

U.S. PATENT DOCUMENTS

| | | | |
|---|---|---|---|
| 2007/0279950 A1* | 12/2007 | Sugiyama et al. | 363/59 |
| 2008/0084239 A1* | 4/2008 | Oswald et al. | 327/536 |
| 2008/0191786 A1 | 8/2008 | Kwon et al. | |
| 2009/0097285 A1 | 4/2009 | Cook et al. | |
| 2009/0231022 A1 | 9/2009 | Kim et al. | |
| 2010/0013445 A1* | 1/2010 | Martinussen | 323/234 |
| 2010/0052771 A1 | 3/2010 | Hartono | |

OTHER PUBLICATIONS

U.S. Appl. No. 12/633,584, filed Dec. 8, 2009.
Office Action mailed Dec. 10, 2010 in U.S. Appl. No. 12/633,584.

* cited by examiner

CHARGE PUMP WITH CHARGE FEEDBACK AND METHOD OF OPERATION

BACKGROUND

1. Field

This disclosure relates generally to circuits, and more specifically, to charge pumps.

2. Related Art

Charge pumps play an important role in a variety of integrated circuits. There are a number of situations where a higher voltage is needed than the power supply voltage. This has become even more significant as power supplies are reducing in magnitude. One example is integrated circuits that include non-volatile memories (NVMs) that are programmed and/or erased. Integrated circuits that are mostly digital but include some analog circuits will sometimes operate the analog circuits at a voltage higher than is needed for the digital circuits. The particular elevated voltage may differ based on the particular application as defined by the user. Thus, it may be useful to be able to vary the magnitude of the elevated voltage. Also the power supply voltage can vary. The power supply can in some cases vary quite significantly, such as from 0.9 volt to 5.0 volts. One of the difficulties with charge pumps is that for a given circuit, the output voltage provided is not linear with respect to time and the voltage provided is provided in increments based on the capacitances being utilized. The increments can be smoothed by reducing the capacitance and increasing the clock frequency but this is limited due to inefficiency becoming a bigger problem at higher frequencies because second and third order effects become more significant at higher frequencies and can even dominate.

Thus there is a need for a charge pump that improves upon one or more of the issues raised above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a charge pump uses an element to transfer some charge back to the input to provide more control of the charge that is provided for the output voltage. This element may be programmable so that, instead of transferring charge back to the input, the element can be used to provide charge to the output. The result is to provide a more predictable output and to provide a more consistent output range when the output is selectable. This is better understood by reference to the drawings and the following description.

Figure 1:
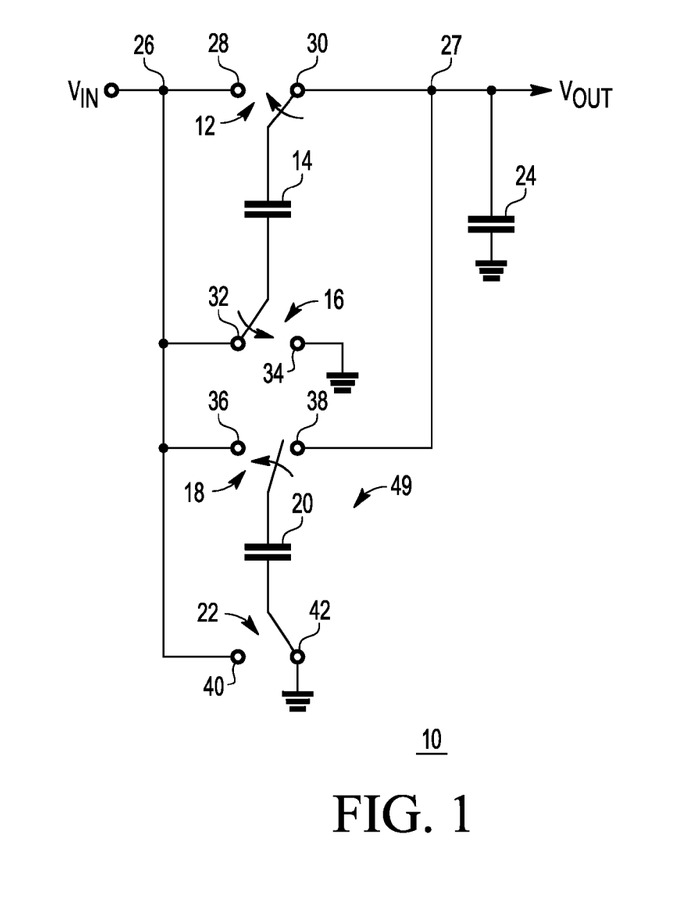
FIG. 1 is a charge pump in a first stage of operation.

Shown in FIG. 1 is a charge pump 10 comprising a switch 12, a capacitor 14, a switch 16, a switch 18, a capacitor 20, a switch 22, and a capacitor 24. Switch 12 has terminals 28 and 30 that are selectively coupled to a first terminal of capacitor 14. Switch 16 has terminals 32 and 34 that are selectively coupled to a second terminal of capacitor 14. Switch 18 has terminals 36 and 38 that are selectively coupled to a first terminal of capacitor 20. Switch 22 has terminals 40 and 42 that are selectively coupled to a second terminal of capacitor 20. A voltage Vin is coupled to a node 26. Node 26 is coupled to terminal 28, terminal 32, terminal 36, and terminal 40. A voltage Vout is provided from a node 27. Node 27 is coupled to terminal 30, and terminal 38. Terminals 34 and 42 are coupled to ground. Capacitor 24 has a first terminal coupled to node 27 and a second terminal coupled to ground. Voltage Vin may be a power supply terminal that receives a power supply voltage VDD. The voltage at VDD in this example can vary significantly, for example, from 0.9 volt to 5.0 volts. Capacitor 24 may be a specific capacitor, a load such as a word line or lines or control gates of transistors, or both a load and a specific capacitor. Switches 18 and 22 and capacitor 20 form a pump cell 49. In this example, ground is being used as a reference voltage for pumping but a different voltage could be used as the reference voltage.

In operation switches 12 and 16 and capacitor 14 operate to provide output voltage Vout at a voltage elevated from the voltage present at Vin. For a first condition, which may be considered as a first phase of a clock, as shown in FIG. 1 Vin is coupled to the second terminal of capacitor 14, and Vout is coupled to the first terminal of capacitor 14. Vout is also coupled to the first terminal of capacitor 20. In this first condition capacitors 20 and 24 are loaded with charge from capacitor 14.

Figure 2:
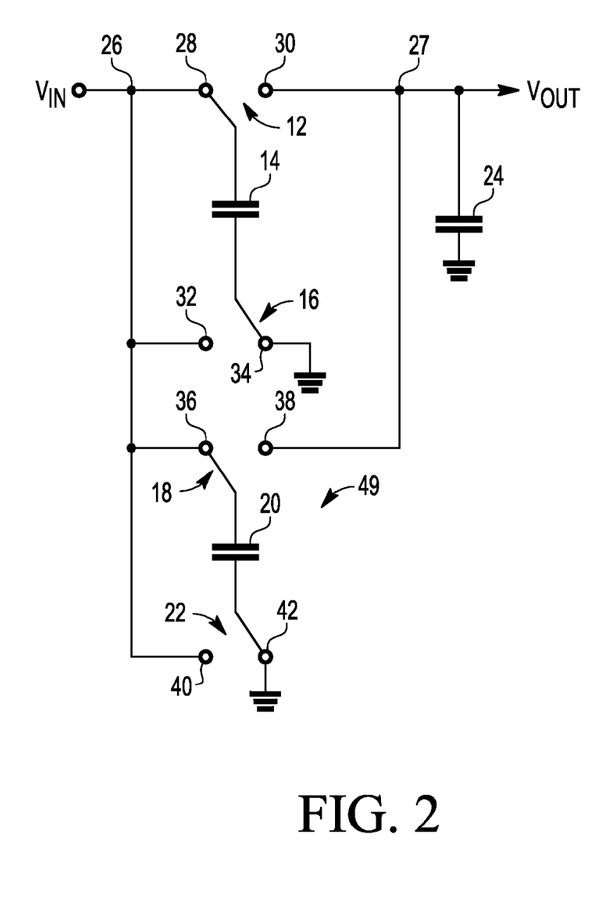
FIG. 2 is the charge pump of FIG. 1 in a second stage of operation.

Shown in FIG. 2 is charge pump 10 in a second condition in which Vin is coupled to the first terminal of capacitor 14 through terminal 28 and the first terminal of capacitor 20 through terminal 36. Terminal 34 is coupled to ground. This has the effect of capacitor 14 being charged to the voltage at Vin. With capacitor 20 having been coupled between ground and Vout which may have been at a higher voltage than Vin, capacitor 20 transfers charge to Vin. The operation of capacitor 14 and switches 12 and 16 is conventional. Capacitor 20 and switch 18 function to reduce the charge rate of node 27 when switch 22 couples the second terminal of capacitor 20 to terminal 42 which is coupled to ground. Switch 22 is for converting capacitor 20 from reducing the charging of capacitor 24 to enhancing the charging of capacitor 24. Switches 12, 16, and 18 are switched between their two states by the conventional clock that is used for charge pumps. Switch 22, on the other hand, provides for the mode of how capacitor 20 is used; either as enhancing or reducing the charging of capacitor 24.

In addition to the circuitry shown in FIGS. 1 and 2, the charging portion of the circuit, which also includes pump cell 49, can be duplicated but operated in complementary fashion to that for the circuitry shown. The effect is that capacitor 24 will be charged on both the rising edge and falling edge of the clock. This is a conventional technique for doubling the charging rate for a given clock frequency. The duplicated circuitry is not shown to avoid unnecessarily complicating the drawings. Also charge pump 10 can provide a maximum of double the voltage of Vin. With pump cell 49 operating in the charge transfer reducing mode, the maximum voltage is less than double the voltage at Vin. If a higher output voltage is required another circuit like charge pump 10 can be cascaded at Vout so that Vout would function as the input voltage for the next stage.

Figure 3:
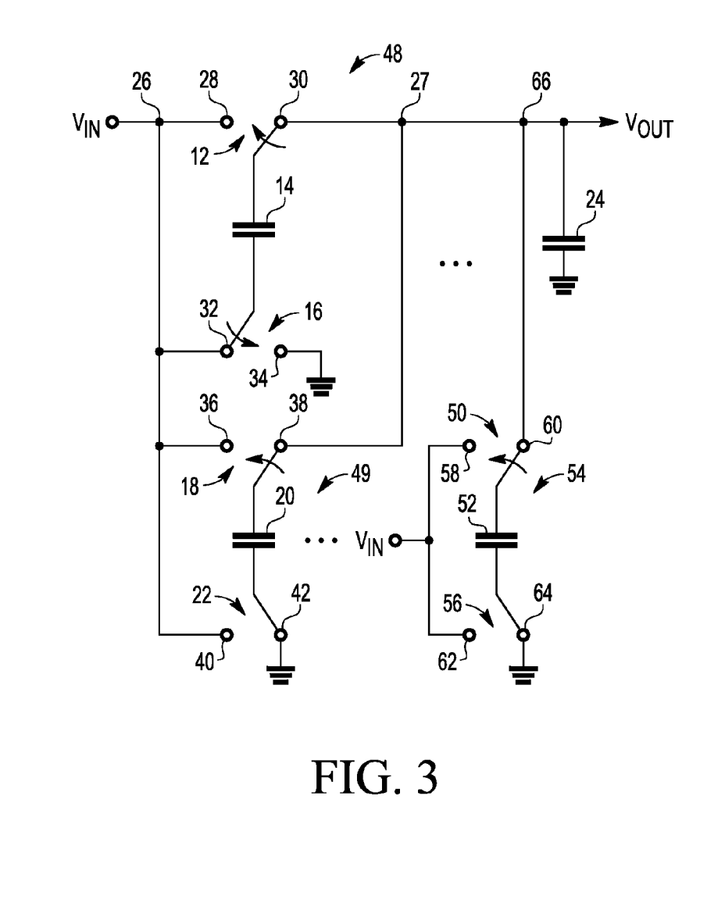
FIG. 3 is a charge pump similar to FIG. 1 having a first configuration.

Shown in FIG. 3 is a charge pump 48 which is charge pump 10 with an additional pump cell 50 comprised of a switch 54, a capacitor 52, and a switch 56. Switch 54 has terminals 58 and 60 that are selectively coupled to a first terminal of capacitor 52. A node 66, which is coupled to Vout, node 27, and the first terminal of capacitor 24 is coupled to terminal 60. Switch 56 has terminals 62 and 64 that are selectively coupled to a second terminal of capacitor 52. Terminals 58 and 62 are coupled to Vin and thus node 26. Additional pump cells are also present but not shown. In this first state, which is shown in FIG. 3, both pump cells 49 and 50 are programmed to the charge transfer reducing mode by terminal 42 coupled to the second terminal of capacitor 20 and terminal 64 being coupled to the second terminal of capacitor 52. With both pump cells 49 and 50 functioning to reduce charge transfer to capacitor 24.

At the beginning of the charging process, Vout is charged to Vin very quickly by the action of capacitor 14. Capacitors 20 and 52 provide charge transfer reduction only when Vout exceeds Vin. In fact capacitors 20 and 52 actually enhance charge transfer to capacitor 24 by being charged to Vin when they are coupled to Vin. When capacitors 20 and 52 are coupled back to Vout, they transfer charge to capacitor 24 so long as Vout is below Vin. Also when Vout is below Vin, capacitor 14 is completely emptied of charge when capacitor 14 is coupled to capacitor 24. After Vout exceeds Vin, capacitor 14 has voltage on its first terminal above ground. Thus the charge added to capacitor 14 when it is coupled to Vin is less than what would be added if the first terminal were able to be at ground when coupled to Vin due to the second terminal being pulled to ground. If Vout reaches 2 times Vin, capacitor 14 does not receive any charge when it is coupled back to Vin, thus Vout cannot increase further. On the other hand, as Vout increases, capacitors 20 and 52 have more voltage across them when their first terminals are coupled to Vout and thus reduce the charge on Vout more when they are coupled back to Vin. Thus, as Vout increases, the charge transfer to Vout decreases and the charge reduction from Vout increases. Eventually there reaches a point at which the charge transfer to Vout is equal to the transfer from Vout. In such case Vout remains constant a voltage that is equal to Vin plus a fraction of Vin. The fraction is the capacitance of the capacitor 14 divided by the sum of the capacitances of capacitor 14, capacitor 20, capacitor 52, and the capacitors of the other pump cells.

Figure 4:
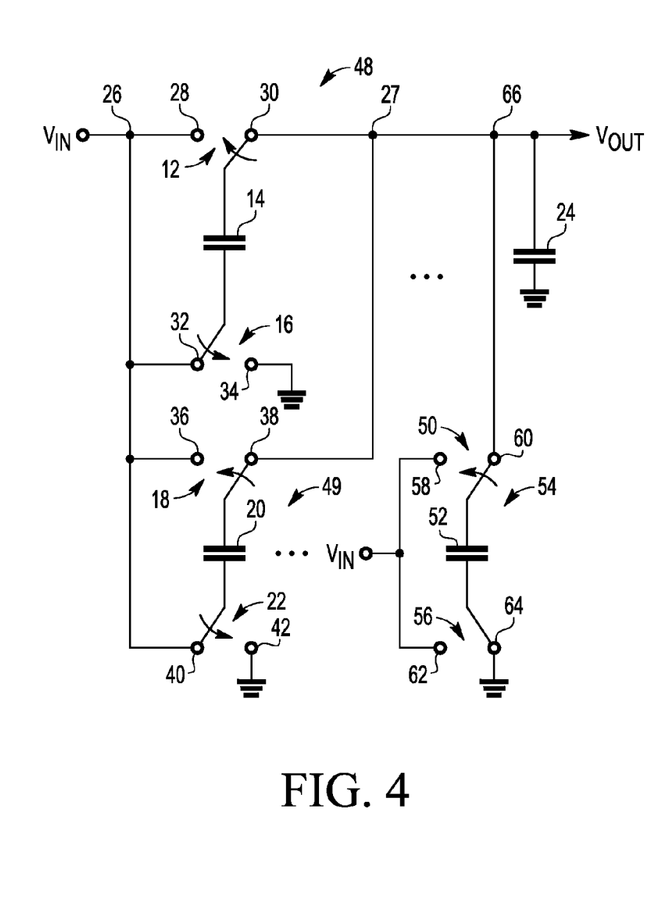
FIG. 4 is the charge pump of FIG. 3 is a second configuration.

Shown in FIG. 4 is charge pump 48 with pump cell 49 programmed to the charge transfer enhancing mode while leaving pump cell 50, as well as the other pump cells not specifically shown, in the charge transfer reducing mode. As shown in FIG. 4, terminal 40 is coupled to the second terminal of capacitor 20 and terminal 38 is coupled to the first terminal of capacitor 20. In this condition, capacitor 20 is transferring charge to node 27 and thus to capacitor 24 and thus aiding Vout in reaching its final voltage. In this mode, pump cell 49 operates the same as capacitor 14 and switches 12 and 16. With pump cell 49 configured as being charge transfer enhancing, capacitor 20 adds charge to capacitor 24. With the change in configuration, the total charge transfer reduction by the pump cells is also reduced. As a consequence the voltage at which Vout stabilizes is higher than for the case shown in FIG. 4. For this case shown in FIG. 4, the stabilized voltage of Vout is equal to Vin plus a fraction of Vin in which the fraction is equal to the capacitance of capacitors 14 and 20 divided by the sum of the capacitances of capacitor 14, capacitor 20, capacitor 52, and the capacitors of the other pump cells.

The effect is that the stabilized voltage of Vout is the ratio of the capacitances configured to be charge transfer enhancing divided by the total capacitance of the charge transfer enhancing and reducing. Thus a change of a pump cell from reducing to enhancing adds to the amount Vout exceeds Vin in direct proportion to the capacitance of the pump cell capacitor. The denominator of the fraction that is applied to Vin in determining Vout is the same regardless of how many pump cells are changed from reducing to enhancing. Thus the only effect is in the numerator. Thus the change to Vout is linear with regard to what is added to Vin.

An alternative to converting a reducing pump cell to an enhancing pump cell would be to simply decouple the reducing pump cell from the charge pump. This would increase Vout. The calculation would be similar in that Vout would be Vin plus a fraction of Vin. The change in the fraction would be by removing the capacitance of the capacitor of the decoupled pump cell from the denominator and leaving the numerator the same. This may provide some benefit, but the linear change to the amount over Vin accomplished by converting from reducing to enhancing is likely to be more beneficial. The process is reversible as well in that a conversion from enhancing to reducing is also possible and would reduce Vout in the same way as it was increased by the conversion from reducing to enhancing. If all of the capacitances were enhancing, then Vout would be 2 times Vin.

Figure 5:
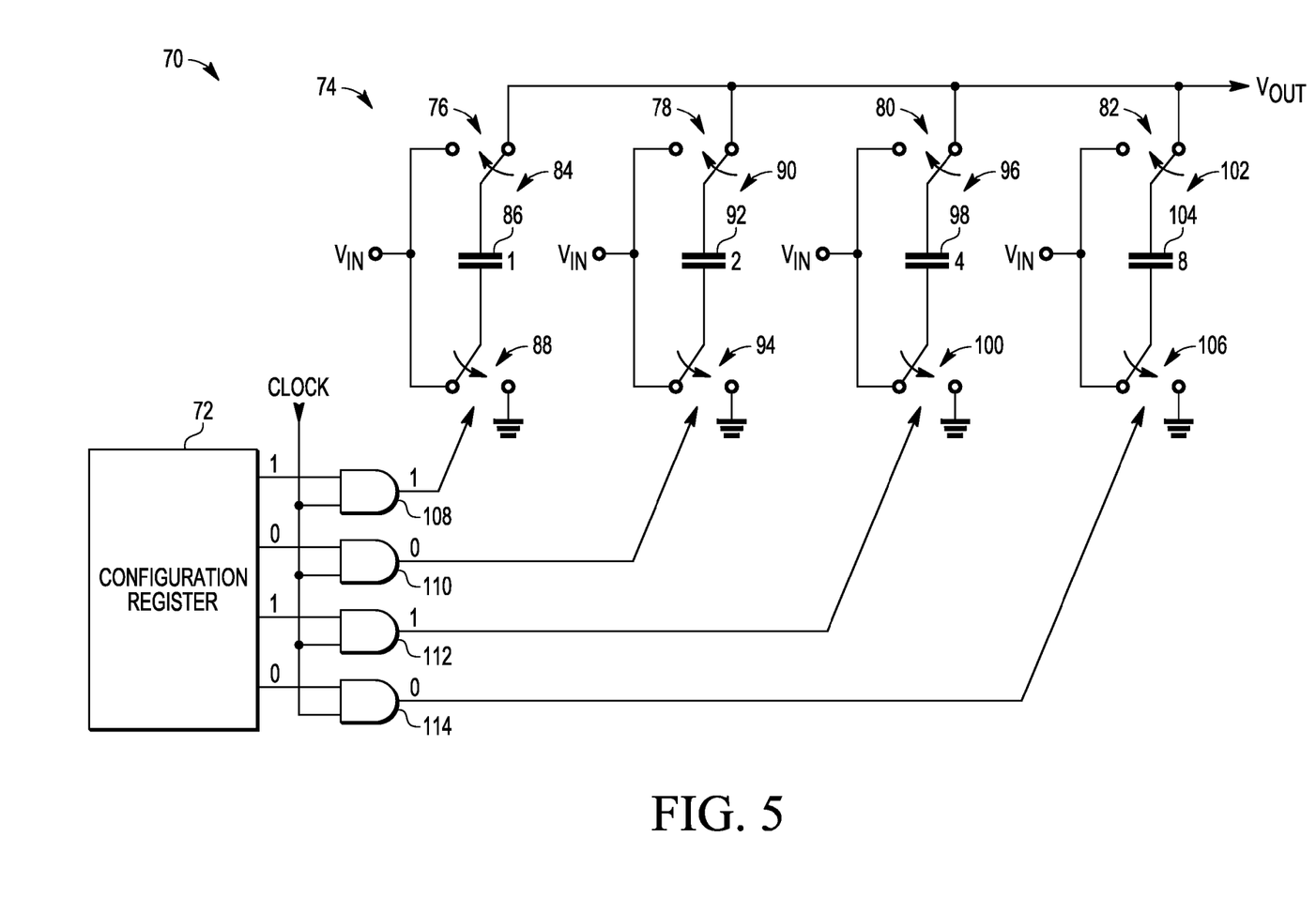
FIG. 5 is programmable pump section useful in a charge pump such as that of FIGS. 3 and 4.

Shown in FIG. 5 is a programmable pump section 70 that could be used for the programmable pump cells, including pump cells 49 and 50, of FIGS. 3 and 4. Programmable pump section is for coupling to a fixed charge pump such as the charge pump made up of capacitor 14 and switches 12 and 16 of FIGS. 1, 2, 3, and 4. Programmable charge pump section 70 (section 70) comprises a configuration register 72, configurable pump cells 74, and AND gates 108, 110, 112, and 114. AND gates are used in this example to describe a logic operation, but the AND function could be achieved with other logic gates. For example, NAND gates or NOR gates could be used with corresponding changes in logic states of the signals being input to the logic gates and the active output could be a logic low instead of a logic high. Configurable pump cells 74 comprises pump cells 76, 78, 80 and 82 which coupled the same and function the same as described for the other pump cells such as pump cells 49 and 50. Pump cell 76 comprises switch 84, capacitor 86, and switch 88. Pump cell 78 comprises switch 90, capacitor 92, and switch 94. Pump cell 80 comprises switch 96, capacitor 98, and switch 100. Pump cell 82 comprises switch 102, capacitor 104, and switch 106. Capacitor 92 has twice the capacitance of capacitor 86. Capacitor 98 has twice the capacitance of capacitor 92 and four times the capacitance of capacitor 86. Capacitor 104 has twice the capacitance of capacitor 98, four times the capacitance of capacitor 92, and eight times the capacitance of capacitor 86. Capacitors 86, 92, 98, and 104 are thus binary weighted so that units of capacitance from 0 to 15 can be selected in units of 1. Configuration register 72 has four outputs comprising a first output, a second output, a third output, and a fourth output that selects the value from 0 to 15. AND gate 108 has a first input coupled to the first output of configuration register 72, a second input for receiving the clock, and an output coupled to switch 88. AND gate 110 has a first input coupled to the second output of configuration register 72, a second input for receiving the clock, and an output coupled to switch 94. AND gate 112 has a first input coupled to the third output of configuration register 72, a second input for receiving the clock, and an output coupled to switch 100. AND gate 114 has a first input coupled to the fourth output of configuration register 72, a second input for receiving the clock, and an output coupled to switch 106.

In operation, configuration register 72 provides an output that represents a value between 0 and 15. In the example shown in FIG. 5, configuration register 72 provides an output of 5 by the first and third output being at 1 and the second and fourth being at 0. AND gates 108 and 112 respond by passing the clock on to switch 88 of pump cell 76 and switch 100 of pump cell 80. This has the effect of switches 88 and 100 responding to the clock and thus making pump cells enhancing the charge transfer in providing Vout. AND gates 110 and 114 are forced to provide a 0 output due to their inputs being at 0 regardless of the logic state of the clock. The result is that switches 94 and 106 are fixed in position so that pump cells 78 and 82 function to reduce charge transfer in establishing the voltage of Vout. For the case where the capacitance of capacitor 14 of FIGS. 3 and 4 is the same as the capacitance of capacitor 86, then Vout will be Vin plus a fraction of VIn wherein the fraction equals 1 plus 1 plus 4 divided by 1 plus 1 plus 2, plus 4, plus 8, which is 6 divided by 16, which is ⅜. In such case the smallest Vout that configuration register 72 can select is Vin plus ¹⁄₁₆ of Vin which occurs when the first, second, third, and fourth outputs of configuration register are 0. The only functioning charge pump is the one made up of capacitor 14 and switches 12 and 16. On the other hand the largest Vout that configuration register 72 can select is Vin plus 16/16 Vin or 2Vin, which occurs when the first, second, third, and fourth outputs of configuration register are 1. Circuit 70 can be duplicated but with the corresponding switches being clocked on the opposite clock edge. This results in a charge transfer in developing Vout on each clock edge. Having duplicate charge pump circuits operating in opposite phases of the clock to achieve a faster pumping rate is well understood in the art.

Figure 6:
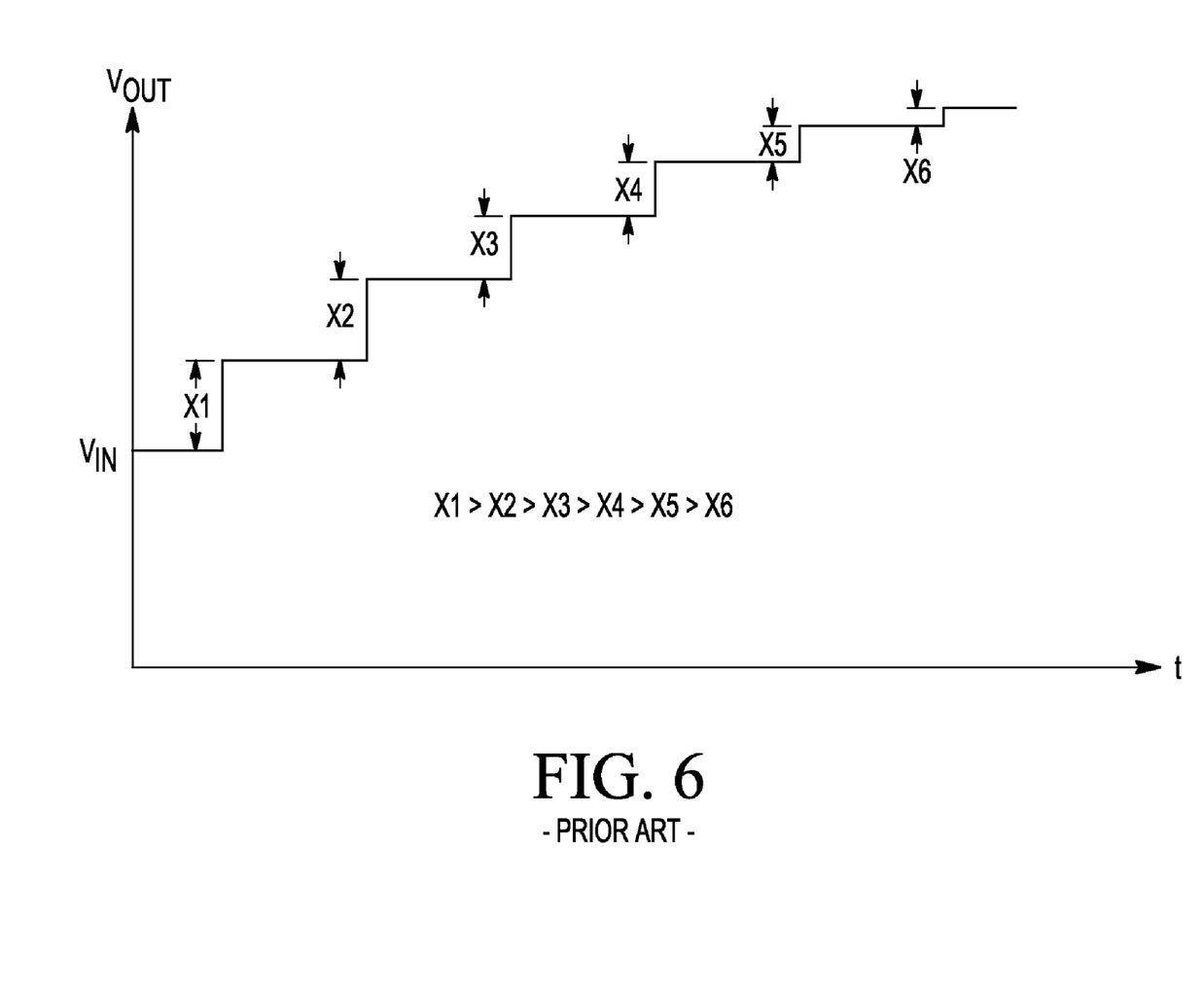
FIG. 6 is a graph of output voltage versus time of a typical charge pump of the prior art.

Shown in FIG. 6 is a graph showing the typical response of a charge pump to being pumped. This shows that the amount of increase of Vout with respect time diminishes. As shown in FIG. 6, each charge transfer raises the voltage as a step X1, X2, X3, X4, X5, and X6. where each step is less that the previous one. This works well if there is a single Vout that is equal to 2Vin. When Vout is desired to be less than 2 Vin, then the charge pump must be turned off when the desired voltage is reached and tuned back on when Vout drops below the desired voltage. For lower voltages of Vout, the difference between the high and low voltage being provided as Vout is relatively large. Further, the particular magnitudes where the steps occur are hard to control because they are a function of capacitor values and switch parasitics that are hard to control due to processing variations.

Figure 7:
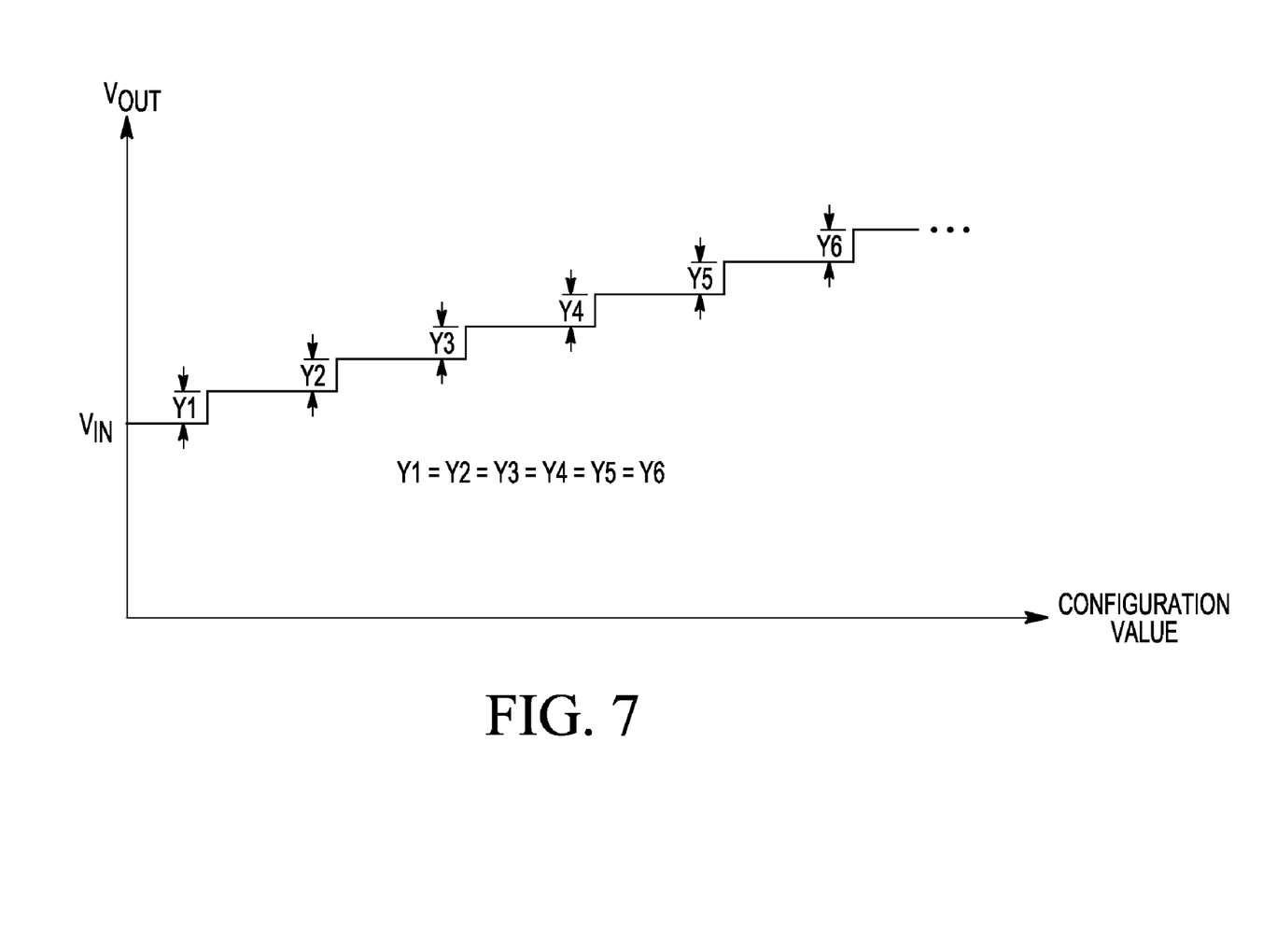
FIG. 7 is a graph of the output voltage for a given configuration for a charge pump using the programmable pump section of FIG. 5.

Shown in FIG. 7 is a graph showing the Vout levels for a given configuration provided by configuration register 72 showing the uniform difference, Y1, Y2, Y3, Y4, Y5, and Y6 for each increment over the range of configuration register 72. Also the particular locations for each step are determined by a ratio of capacitances. The actual capacitance values are difficult to control but for a given device the process is the same for all of the capacitors on the device so that the ratios are very well controlled. Accordingly the step locations are very predictable. Also Vout need not be responsive to some reference and some detection circuit that turns the charge pump off and on based on Vout relative to the reference. The value of Vout is determined by the configuration register. The configuration register can be operated as something that the user can select and change, the user can select once and retain the value, or something similar or the Vout selection may be achieved during manufacturing by techniques such as fuse blowing or mask programming.

By now it should be appreciated that there has been provided a charge pump. The charge pump includes a first capacitor having a first terminal and a second terminal. The charge further includes a first switch coupled to the first terminal of the first capacitor for coupling the first terminal to either an input terminal for receiving an input voltage or to an output node. The charge further includes a second switch coupled to the second terminal of the first capacitor for coupling the second terminal to either a reference voltage terminal or to the input terminal. The charge further includes an output capacitance having a first terminal coupled to the second terminal of the first switch and having a second terminal coupled to the reference voltage terminal, the output capacitance receiving charge from the input terminal and the first capacitor. The charge further includes a second capacitor having a first terminal and a second terminal, the second terminal being coupled to the reference voltage terminal. The charge further includes a third switch coupled to the first terminal of the second capacitor for selectively coupling the first terminal of the second capacitor to either the first terminal of the output capacitance or the input terminal, the second capacitor selectively removing charge from the output capacitance using the third switch and coupling said charge to the input terminal as feedback. The charge pump may further include a fourth switch coupled to the second terminal of the second capacitor for selectively alternating coupling of the second terminal of the second capacitor between the reference voltage terminal and the input terminal. The charge pump may further include a third capacitor having a first terminal and a second terminal; a fourth switch coupled to the first terminal of the third capacitor for coupling the first terminal to either the output node or to the input terminal for receiving the input voltage; and a fifth switch coupled to the second terminal of the third capacitor for coupling the second terminal to either the reference voltage terminal or to the input terminal. The charge pump may further include a plurality of feedback charge transfer capacitors, each having a first terminal and a second terminal; a first plurality of switches, each being coupled to the first terminal of a respective one of the plurality of feedback charge transfer capacitors for coupling the first terminal of the respective one of the plurality of feedback charge transfer capacitors to either the output node or to the input terminal for receiving the input voltage; and a second plurality of switches, each being coupled to the second terminal of a respective one of the plurality of feedback charge transfer capacitors for coupling the second terminal of the respective one of the plurality of feedback charge transfer capacitors to either the input terminal for receiving the input voltage or to the reference voltage terminal. The charge pump may have a further characterization by which the configuration register generates a plurality of successive differing configuration values which selectively make an output voltage at the output node increase a same amount in response to successively changing configuration values. The configuration logic may further include a configuration register for storing user provided selection signals to select a desired regulated output voltage value; and a plurality of logic gates, each of the plurality of logic gates providing a predetermined one of a plurality of control signals. The charge pump may have a further characterization by which each of the plurality of logic gates has a first input for receiving an oscillating clock signal, a second input for receiving a predetermined bit of one of the user provided selection signals, and an output for providing the predetermined one of the plurality of control signals.

A method is also described. The method includes charging a first capacitor to a predetermined input voltage using a first switch coupled to a first terminal of the first capacitor for coupling the first terminal to an input terminal for receiving the predetermined input voltage and using a second switch for coupling a second terminal of the first capacitor to a reference voltage terminal. The method further includes sequentially transferring charge from the first capacitor to an output capacitance by using the first switch and sequentially removing a portion of charge from the output capacitance to the input terminal using a third switch and a second capacitor. The method may further include selectively coupling a first plurality of capacitors between the output capacitance and the input terminal in response to a user provided control signal of the charge pump having one of a plurality of values to select an output voltage value by determining a number of capacitors of the first plurality of capacitors which sequentially remove charge from the output capacitance. The method may further include configuring a portion of the first plurality of capacitors to assist the first capacitor to sequentially transfer charge to the output capacitance. The method may further include storing the user provided control signal for selecting the output voltage value of the charge pump in a configuration register; and coupling logic circuitry to the configuration register for generating a selection signal for selecting the output voltage value. The method may further include successively generating a plurality of successive differing configuration values which make the output voltage value increase a same amount in response to successively changing configuration values.

Described also is a charge pump. The charge pump includes first capacitance means having a first terminal and a second terminal. The charge pump further includes a first switching means coupled to the first terminal of the first capacitance means for coupling the first terminal to either an input terminal for receiving an input voltage or to an output node for providing an output voltage. The charge pump further includes a second switching means coupled to the second terminal of the first capacitance means for coupling the second terminal to either a reference voltage terminal or to the input terminal, the second switching means coupling the second terminal of the first capacitance means to the reference voltage terminal when the first switching means couples the first terminal of the first capacitance means to the input terminal, the second switching means coupling the second terminal of the first capacitance means to the input terminal when the first switching means couples the first terminal of the first capacitance means to the output node. The charge pump further includes an output capacitance means having a first terminal coupled to the second terminal of the first switching means and having a second terminal coupled to the reference voltage terminal, the output capacitance means receiving charge from the input terminal and the first capacitance means. The charge pump further includes a second capacitance means having a first terminal and a second terminal, the second terminal being coupled to the reference voltage terminal. The charge pump further includes a third switching means coupled to the first terminal of the second capacitance means for selectively coupling the first terminal of the second capacitance means to either the first terminal of the output capacitance means or the input terminal, the second capacitance means selectively removing charge from the output capacitance means using the third switching means and coupling said charge to the input terminal by coupling the first terminal of the second capacitance means to the first terminal of the output capacitance means and coupling the second terminal of the second capacitance means to the reference voltage terminal when the first switching means is coupling the first terminal of the first capacitance means to the output node and the second switching means is coupling the second terminal of the first capacitance means to the input terminal. The charge pump may further comprise a fourth switching means coupled to the second terminal of the second capacitance means for selectively alternating coupling of the second terminal of the second capacitance means to between the reference voltage terminal and the input terminal. The charge pump may further comprise a third capacitance means having a first terminal and a second terminal; a fourth switching means coupled to the first terminal of the third capacitance means for coupling the first terminal to either the output node or to the input terminal for receiving the input voltage; and a fifth switching means coupled to the second terminal of the third capacitance means for coupling the second terminal to either the reference voltage terminal or to the input terminal. The charge pump may further comprise a plurality of feedback charge transfer capacitance means, each having a first terminal and a second terminal; a first plurality of switching means, each being coupled to the first terminal of a respective one of the plurality of feedback charge transfer capacitance means for coupling the first terminal of the respective one of the plurality of feedback charge transfer capacitance means to either the output node or to the input terminal for receiving the input voltage; and a second plurality of switching means, each being coupled to the second terminal of a respective one of the plurality of feedback charge transfer capacitance means for coupling the second terminal of the respective one of the plurality of feedback charge transfer capacitance means to either the input terminal for receiving the input voltage or to the reference voltage terminal. The charge pump may further comprise configuration logic means coupled to a control terminal of each of the second plurality of switching means, the configuration logic means providing control signals to make one or more of the plurality of charge transfer capacitance means switch at a same time as the first capacitance means switches. The configuration logic may further comprise configuration register means for storing user provided selection signals to select a desired regulated output voltage value; and a plurality of logic gates, each of the plurality of logic gates providing a predetermined one of a plurality of control signals. The charge pump may have a further characterization by which each of the plurality of logic gates has a first input for receiving an oscillating clock signal, a second input for receiving a predetermined bit of one of the user provided selection signals, and an output for providing the predetermined one of the plurality of control signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, the specific pump cells had a particular structure that is considered beneficial, other structures may be found to be useful. The switching function was shown in the figures. as conventional switches with the understanding that switching devices are transistors typically N and P channel transistors in which the gates receive the true or complement of the clock or some other controlling signal and the current electrodes of the transistors form terminals through which charge is transferred in a manner consistent with the way the switches are drawn. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A charge pump, comprising:
   a first capacitor having a first terminal and a second terminal;
   a first switch coupled to the first terminal of the first capacitor for coupling the first terminal to either an input terminal for receiving an input voltage or to an output node;
   a second switch coupled to the second terminal of the first capacitor for coupling the second terminal to either a reference voltage terminal or to the input terminal;
   an output capacitance having a first terminal coupled to the second terminal of the first switch and having a second terminal coupled to the reference voltage terminal, the output capacitance receiving charge from the input terminal and the first capacitor;
   a second capacitor having a first terminal and a second terminal, the second terminal being coupled to the reference voltage terminal; and
   a third switch coupled to the first terminal of the second capacitor for selectively coupling the first terminal of the second capacitor to either the first terminal of the output capacitance or the input terminal, the second capacitor selectively removing charge from the output capacitance using the third switch and coupling said charge to the input terminal as feedback.

2. The charge pump of claim 1 further comprising:
   a fourth switch coupled to the second terminal of the second capacitor for selectively alternating coupling of the second terminal of the second capacitor between the reference voltage terminal and the input terminal.

3. The charge pump of claim 1 further comprising:
   a third capacitor having a first terminal and a second terminal;
   a fourth switch coupled to the first terminal of the third capacitor for coupling the first terminal to either the output node or to the input terminal for receiving the input voltage; and
   a fifth switch coupled to the second terminal of the third capacitor for coupling the second terminal to either the reference voltage terminal or to the input terminal.

4. The charge pump of claim 1 further comprising:
   a plurality of feedback charge transfer capacitors, each having a first terminal and a second terminal;
   a first plurality of switches, each being coupled to the first terminal of a respective one of the plurality of feedback charge transfer capacitors for coupling the first terminal of the respective one of the plurality of feedback charge transfer capacitors to either the output node or to the input terminal for receiving the input voltage; and
   a second plurality of switches, each being coupled to the second terminal of a respective one of the plurality of feedback charge transfer capacitors for coupling the second terminal of the respective one of the plurality of feedback charge transfer capacitors to either the input terminal for receiving the input voltage or to the reference voltage terminal.

5. The charge pump of claim 4 further comprising:
   configuration logic coupled to a control terminal of each of the second plurality of switches, the configuration logic providing control signals to make one or more of the plurality of feedback charge transfer capacitors switch the same as the first capacitor switches.

6. The charge pump of claim 5 wherein the configuration register generates a plurality of successive differing configuration values which selectively make an output voltage at the output node increase a same amount in response to successively changing configuration values.

7. The charge pump of claim 4 wherein the configuration logic further comprises:
   a configuration register for storing user provided selection signals to select a desired regulated output voltage value; and
   a plurality of logic gates, each of the plurality of logic gates providing a predetermined one of a plurality of control signals.

8. The charge pump of claim 7 wherein each of the plurality of logic gates has a first input for receiving an oscillating clock signal, a second input for receiving a predetermined bit of one of the user provided selection signals, and an output for providing the predetermined one of the plurality of control signals.

9. A method comprising:
   charging a first capacitor to a predetermined input voltage using a first switch coupled to a first terminal of the first capacitor for coupling the first terminal to an input terminal for receiving the predetermined input voltage and using a second switch for coupling a second terminal of the first capacitor to a reference voltage terminal; and
   sequentially transferring charge from the first capacitor to an output capacitance by using the first switch and sequentially removing a portion of charge from the output capacitance to the input terminal using a third switch and a second capacitor.

10. The method of claim 9 further comprising:
    selectively coupling a first plurality of capacitors between the output capacitance and the input terminal in response to a user provided control signal of the charge pump having one of a plurality of values to select an output voltage value by determining a number of capacitors of the first plurality of capacitors which sequentially remove charge from the output capacitance.

11. The method of claim 10 further comprising:
    configuring a portion of the first plurality of capacitors to assist the first capacitor to sequentially transfer charge to the output capacitance.

12. The method of claim 10 further comprising:
storing the user provided control signal for selecting the output voltage value of the charge pump in a configuration register; and
coupling logic circuitry to the configuration register for generating a selection signal for selecting the output voltage value.

13. The method of claim 12 further comprising:
successively generating a plurality of successive differing configuration values which make the output voltage value increase a same amount in response to successively changing configuration values.

14. A charge pump comprising:
first capacitance means having a first terminal and a second terminal;
a first switching means coupled to the first terminal of the first capacitance means for coupling the first terminal to either an input terminal for receiving an input voltage or to an output node for providing an output voltage;
a second switching means coupled to the second terminal of the first capacitance means for coupling the second terminal to either a reference voltage terminal or to the input terminal, the second switching means coupling the second terminal of the first capacitance means to the reference voltage terminal when the first switching means couples the first terminal of the first capacitance means to the input terminal, the second switching means coupling the second terminal of the first capacitance means to the input terminal when the first switching means couples the first terminal of the first capacitance means to the output node;
an output capacitance means having a first terminal coupled to the second terminal of the first switching means and having a second terminal coupled to the reference voltage terminal, the output capacitance means receiving charge from the input terminal and the first capacitance means;
a second capacitance means having a first terminal and a second terminal, the second terminal being coupled to the reference voltage terminal; and
a third switching means coupled to the first terminal of the second capacitance means for selectively coupling the first terminal of the second capacitance means to either the first terminal of the output capacitance means or the input terminal, the second capacitance means selectively removing charge from the output capacitance means using the third switching means and coupling said charge to the input terminal by coupling the first terminal of the second capacitance means to the first terminal of the output capacitance means and coupling the second terminal of the second capacitance means to the reference voltage terminal when the first switching means is coupling the first terminal of the first capacitance means to the output node and the second switching means is coupling the second terminal of the first capacitance means to the input terminal.

15. The charge pump of claim 14 further comprising:
a fourth switching means coupled to the second terminal of the second capacitance means for selectively alternating coupling of the second terminal of the second capacitance means to between the reference voltage terminal and the input terminal.

16. The charge pump of claim 14 further comprising:
a third capacitance means having a first terminal and a second terminal;
a fourth switching means coupled to the first terminal of the third capacitance means for coupling the first terminal to either the output node or to the input terminal for receiving the input voltage; and
a fifth switching means coupled to the second terminal of the third capacitance means for coupling the second terminal to either the reference voltage terminal or to the input terminal.

17. The charge pump of claim 14 further comprising:
a plurality of feedback charge transfer capacitance means, each having a first terminal and a second terminal;
a first plurality of switching means, each being coupled to the first terminal of a respective one of the plurality of feedback charge transfer capacitance means for coupling the first terminal of the respective one of the plurality of feedback charge transfer capacitance means to either the output node or to the input terminal for receiving the input voltage; and
a second plurality of switching means, each being coupled to the second terminal of a respective one of the plurality of feedback charge transfer capacitance means for coupling the second terminal of the respective one of the plurality of feedback charge transfer capacitance means to either the input terminal for receiving the input voltage or to the reference voltage terminal.

18. The charge pump of claim 17 further comprising:
configuration logic means coupled to a control terminal of each of the second plurality of switching means, the configuration logic means providing control signals to make one or more of the plurality of charge transfer capacitance means switch at a same time as the first capacitance means switches.

19. The charge pump of claim 18 wherein the configuration logic means further comprise:
configuration register means for storing user provided selection signals to select a desired regulated output voltage value; and
a plurality of logic gates, each of the plurality of logic gates providing a predetermined one of a plurality of control signals.

20. The charge pump of claim 19 wherein each of the plurality of logic gates has a first input for receiving an oscillating clock signal, a second input for receiving a predetermined bit of one of the user provided selection signals, and an output for providing the predetermined one of the plurality of control signals.

* * * * *